US011366830B1

(12) United States Patent
Hassan

(10) Patent No.: US 11,366,830 B1
(45) Date of Patent: Jun. 21, 2022

(54) TECHNIQUES FOR LIVE REPARTITIONING OF CROSS-SERVICE DATABASE SHARDS

(71) Applicant: Oracle International Corporation, Redwood Shores, CA (US)

(72) Inventor: Mohamed Saber Abdelfattah Hassan, Sammamish, WA (US)

(73) Assignee: Oracle International Corporation, Redwood, CA (US)

( * ) Notice: Subject to any disclaimer, the term of this patent is extended or adjusted under 35 U.S.C. 154(b) by 0 days.

(21) Appl. No.: 17/130,739

(22) Filed: Dec. 22, 2020

(51) Int. Cl.
*G06F 16/00* (2019.01)
*G06F 16/27* (2019.01)
*G06F 16/215* (2019.01)
*G06F 16/21* (2019.01)
*G06F 16/182* (2019.01)
*G06F 16/84* (2019.01)

(52) U.S. Cl.
CPC .......... *G06F 16/278* (2019.01); *G06F 16/182* (2019.01); *G06F 16/214* (2019.01); *G06F 16/215* (2019.01); *G06F 16/86* (2019.01)

(58) Field of Classification Search
CPC .... G06F 16/182; G06F 16/214; G06F 16/215; G06F 16/278; G06F 16/86
See application file for complete search history.

(56) References Cited

U.S. PATENT DOCUMENTS

| | | | | |
|---|---|---|---|---|
| 8,850,423 B2* | 9/2014 | Barkie | ...................... | G06F 8/63 717/176 |
| 10,761,740 B1* | 9/2020 | Bradshaw | ............... | G06F 3/068 |
| 11,238,016 B1* | 2/2022 | Srinivasan | ............ | G06F 16/254 |
| 2012/0265726 A1* | 10/2012 | Padmanabhan | ....... | G06F 16/214 707/602 |
| 2014/0279830 A1* | 9/2014 | Majumdar | ............ | G06F 16/283 707/602 |
| 2015/0120672 A1* | 4/2015 | Joglekar | ............... | G06F 3/0647 707/667 |
| 2016/0062786 A1* | 3/2016 | Meng | .................. | H04L 41/0846 718/1 |
| 2016/0092499 A1* | 3/2016 | Leigh | ........................ | G06F 8/34 707/740 |
| 2017/0103116 A1* | 4/2017 | Hu | ....................... | G06F 16/2272 |
| 2021/0048995 A1* | 2/2021 | Myers | ....................... | G06F 8/60 |
| 2021/0349865 A1* | 11/2021 | Shah | .................. | G06Q 30/0283 |

* cited by examiner

*Primary Examiner* — Diedra McQuitery
(74) *Attorney, Agent, or Firm* — Kilpatrick Townsend & Stockton LLP

(57) ABSTRACT

Techniques for live migration of cloud resource infrastructure metadata are provided. A method may include receiving a resharding request associated with a database configured to store resource metadata according to a first database configuration. The resource metadata may be identified by a first mapping. The method may include preparing the resource metadata for migration to a second database configuration corresponding with a second mapping. The method may include migrating a subset of the resource metadata within the database in accordance with the second mapping. The method may include while migrating the subset of the resource metadata, serving requests on the resource metadata according to the first database configuration. The method may include after migrating the subset of the resource metadata, installing the second database configuration. The method may also include removing the subset of the resource metadata remaining in the database according to the first database configuration.

20 Claims, 10 Drawing Sheets

TECHNIQUES FOR LIVE REPARTITIONING OF CROSS-SERVICE DATABASE SHARDS

BACKGROUND

Cloud-based platforms provide scalable and flexible computing resources for users. Such cloud-based platforms, also referred to as infrastructure as a service (IaaS), may offer entire suites of cloud solutions around a customer's data, for example, solutions for authoring transformations, loading data, and presenting the data.

Cross-service data is collected as part of managing cloud resource allocation, management, and infrastructure planning. Centrally managed databases of cloud resource metadata may be limited by physical storage capacity of database partitions, which may present challenges when scaling to accommodate growth in data volumes. For example, scaling metadata databases may include significant downtime and latency while data is migrated to newly added database partitions.

BRIEF SUMMARY

Techniques are provided (e.g., a method, a system, non-transitory computer-readable medium storing code or instructions executable by one or more processors) for centralized management of cross-service data of cloud resources in a single data management service.

In certain embodiments, a method may include receiving, by a computer system, a resharding request associated with a database. The database may be configured to store resource metadata according to a first database configuration. The resource metadata may be identified by a first mapping. The method may include preparing, by the computer system, the resource metadata for migration to a second database configuration corresponding with a second mapping. The method may include migrating, by the computer system, a subset of the resource metadata within the database in accordance with the second mapping. The method may include while migrating the subset of the resource metadata, serving, by the computer system, requests on the resource metadata according to the first database configuration. The method may include after migrating the subset of the resource metadata, installing, by the computer system, the second database configuration. The method may also include removing, by the computer system, the subset of the resource metadata remaining in the database according to the first database configuration.

In some embodiments, the resharding request may correspond to an increase in a number of physical partitions of the database. The number of physical partitions may be a first number of physical partitions. For an entry of the resource metadata, the first mapping may describe a first location of the entry in the first number of physical partitions in accordance with the first database configuration; and the second mapping may describe a second location of the entry in a second number of physical partitions in accordance with the second database configuration. Preparing the resource metadata for migration may include generating the second mapping corresponding to the second database configuration, determining the subset of the resource metadata, notifying a plurality of active hosts of the resharding request and the second mapping, and receiving an acknowledgment of the resharding request from the plurality of active hosts. Migrating the subset of the resource metadata within the database may include locating an entry of the subset of the resource metadata in the database using the first database configuration, locking the entry for requests, copying the entry to a new physical partition of the database according to the second database configuration, and flagging the entry to reflect the second mapping. Migrating the subset of the resource metadata within the database may further include receiving new resource metadata and storing the new resource metadata according to the first database configuration. Serving the requests on the resource metadata according to the first database configuration may include receiving a read/write request for an entry according to the first mapping. In accordance with the entry being excluded from the subset of the resource metadata, serving the requests on the resource metadata according to the first database configuration may include executing the read/write request according to the first mapping. In accordance with the entry being included in the subset of the resource metadata and being locked, serving the requests on the resource metadata according to the first database configuration may include holding the read/write request while the entry is locked. In accordance with the entry being included in the subset of the resource metadata and being stored in the database according to the first database configuration, serving the requests on the resource metadata according to the first database configuration may include executing the read/write request according to the first mapping. In accordance with the entry being included in the subset of the resource metadata and being stored in the database according to the second database configuration, serving the requests on the resource metadata according to the first database configuration may include executing the read/write request according to the second mapping. Installing the second database configuration may include serving requests on the resource metadata according to the second database configuration after the subset of the resource metadata is migrated.

In certain embodiments, a computer system includes one or more processors and a memory in communication with the one or more processors, the memory configured to store computer-executable instructions, wherein executing the computer-executable instructions causes the one or more processors to perform one or more of the steps of the method or its variations described above.

In certain embodiments, a computer-readable storage medium stores computer-executable instructions that, when executed, cause one or more processors of a computer system to perform one or more steps of the method or its variations described above.

DETAILED DESCRIPTION

Figure 1:
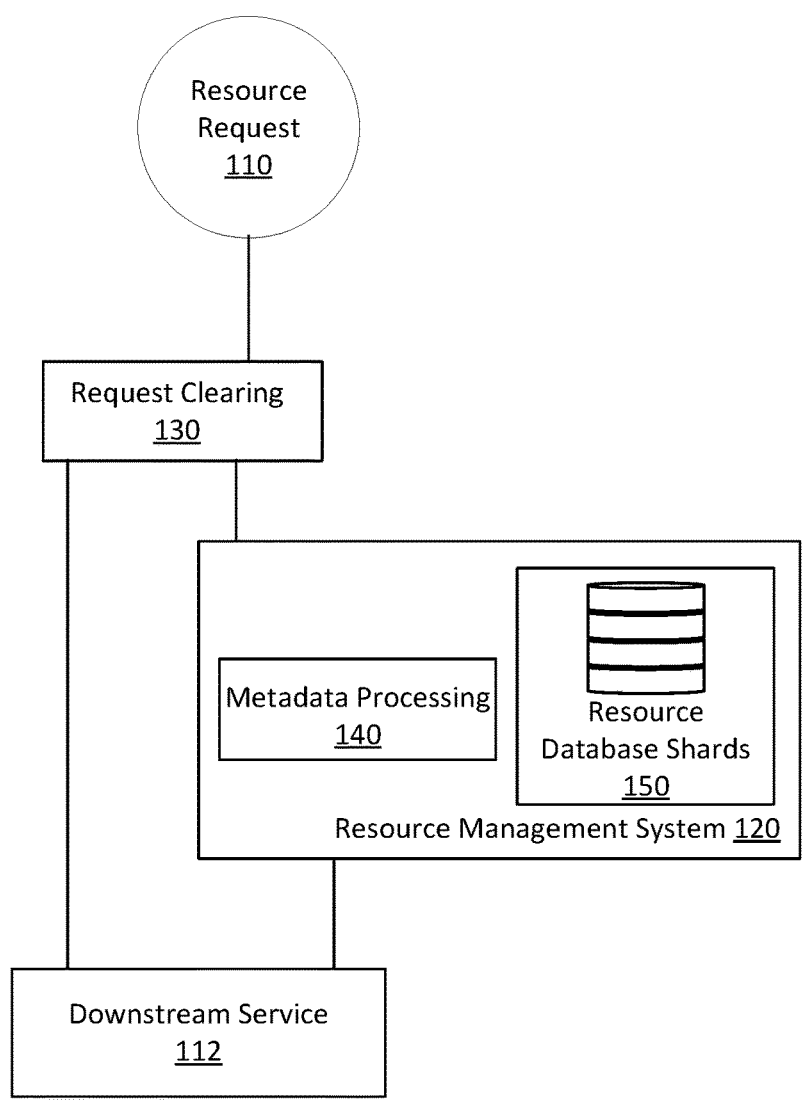
FIG. 1 illustrates an example system for managing cross-service data of cloud resources, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS) may offer entire suites of cloud solutions around a customer's data, for example solutions for authoring transformations, loading data, and presenting the data. Cross-service data is collected as part of managing cloud resource allocation, management, and infrastructure planning. Centrally managed databases of cloud resource metadata may be limited by physical storage capacity, which may make scaling to accommodate growth in resource metadata volumes difficult. For example, scaling metadata databases may include significant downtime and latency while data is migrated with added database capacity.

In an illustrative example, a database system may store resource metadata in a number of physical database shards, where shards describe a data partition on a storage medium, and where each physical database shard may have a set storage capacity. To potentially avoid capacity limits, the database may be scaled in correlation with growth rates in data volume. Scaling the database may include adding physical database shards to increase the total storage capacity of the database. As part of efficient operation of the database system, adding new physical database shards may include migrating data already stored in the database, as well as storing newly created data in the newly-added physical database shards. In this way, scaling the database may include identifying existing data in the physical database shards and migrating that data over to the newly-added physical database shards. This partial migration, while adding operations to scaling beyond simply making available new storage capacity, may permit improved load balancing across the database and may also provide the ability for metadata volumes to grow with reduced migration and partitioning of data across physical shards between scaling operations.

The process of adding new physical database shards, identifying and migrating data from existing shards to newly-added shards, and remapping the data to the new database configuration is referred to as "resharding." Resharding in this manner may provide significant improvements to overall performance of centralized, cross-service metadata management systems, by providing a technique for scaling database capacity without incurring downtime or significant latency when new physical database shards are added. In this way, a metadata management service that implements resharding may continue to serve resource metadata requests. In contrast, alternative approaches, which rely on locking database shards while resource metadata is migrated, may make resource metadata unavailable for a period of time on the order of minutes or hours. Since resource metadata may reflect the current states of resource usage in a distributed computing system, from which decisions on resource allocation may be made, downtime on such a scale may significantly impair the operation of an IaaS system as a whole. As such, resharding, including live-migration (e.g., serving requests while data migration is underway), may represent a significant improvement over such approaches, and may permit an IaaS system to scale database capacity on a more frequent basis and with reduced impact on system performance.

FIG. 1 illustrates an example system 100 for managing cross-service data of cloud resources, in accordance with one or more embodiments. As illustrated, the system 80 includes multiple system elements interposed between a resource request 110, for example, as generated by a customer of an IaaS service, and a downstream service 112 that will provide the IaaS service. In some embodiments, the additional system elements include a resource management system 120, including request clearing 130, metadata processing 140, and one or more resource database shards 150. The resource request 110, in this example, includes a request for allocating a cloud-service resource, including, but not limited to, computation resources, cloud storage, object storage, network resources, or the like.

In the example illustrated, the request clearing 130 receives the resource request 110, and tracks and/or generates resource usage metadata that is passed to the metadata processing 140 (e.g., a request identifier). The request clearing 130 also persists the resource request 110 to the downstream service 112 to execute the request, as described in more detail in reference to FIG. 2, below. In some embodiments, the request clearing 130 also determines and/or enforces limiting rules associated with the resource request 110. Limiting rules may include a resource usage quota (or other limit and/or constraint) associated with the type of resource that is the subject of the resource request 110. In some embodiments, the metadata processing 140 is called by the request clearing 130 to validate the resource request 110.

In some embodiments, quotas are set on a compartment level, where compartments are logical containers instituted to organize and control access to cloud-service resources (e.g., computation resources, cloud storage, object storage, network resources, load balancers, virtual cloud networks, etc.). Compartments may be organized in levels, where upper-level compartments manage lower level compartments, according to identity and access management resources.

The request clearing 130 may act as an entry point for calling application programming interfaces (APIs) of platform services. As such, the request clearing 130 may determine whether the resource request 110 violates the resource usage quota, and in some cases may pass the resource request 110 to the downstream service 112 for implementation. Additionally, the request clearing may send and/or persist metadata associated with the resource request 110 to the metadata processing 140, as part of generating and/or tracking resource usage by the downstream service 112.

While the example system 100 illustrated describes a single resource request 110 for a single downstream service 112, the resource management system 120 may accommodate and/or process multiple resource requests for multiple resources and resource types intended for multiple downstream services. In some embodiments, the resource request 92 may specify one resource. In some embodiments, a cloud IaaS system may implement multiple instances of the resource management system 120 in a geographical region.

In the example system 100, the metadata associated with the resource request 110 is stored and/or persisted by the metadata processing 140 in the resource database shards 150. The resource database shards 150 may include block volume storage, object storage, or the like. The metadata processing 140 may manage input and output (I/O) operations with respect to updating and/or processing resource metadata stored in the resource database shards 150. As described in more detail in reference to FIG. 2, the metadata processing 140 may implement the resource database shards 150 with logical sharding to map resource metadata to physical database shards on the resource level and/or the compartment level.

The metadata associated with the resource request 110, including the type of request, the type and identifier of resource (referred to as "resource identifier" below), as well as other characteristics of the resource request 110, may be stored in the resource database shards 150. In some embodiments, the resource database shards 150 store data including, but not limited to, resource metadata, resource usage, descriptive information for each resource request 110 (e.g., a unique request identifier), as well as the type of request (e.g., requests to move a resource from one compartment to another compartment, requests to modify either a usage quota for a specific resource, etc.). In some embodiments, the resource database shards 150 also store compartment-level quota usage, which may include aggregate data at the compartment and the tenancy level, and which may be used when updating resource metadata usage records for provision to external requestors. In some embodiments, the resource metadata may include information describing the availability domain of the downstream resource, where the availability domain may correspond to a data center or the IaaS infrastructure in a given physical location. In some embodiments, the resource metadata from the resource request 110 that is stored and/or persisted by the metadata processing 140 includes, but is not limited to, a unique resource identifier, a compartment identifier to locate the compartment containing the resource addressed by the resource request 110, a resource status that indicates whether a resource should be counted for quota usage (e.g., whether the resource has been attributed to the downstream service 112), or a tenancy identifier that is used in mapping the creation of a new resource.

Quotas on the compartment level may introduce complexity into resharding operations. For example, aggregate compartment-level resource metadata may cause the resource management system 120 to store resource metadata for a given compartment in a single physical database shard. In this way, resharding may include migrating resource metadata for the given compartment atomically (e.g., moving all data associated with the compartment or moving no data).

In some embodiments, the resource metadata also includes one or more elements to optimize database operations, which may, in turn, reduce demand on computational resources dedicated to the metadata processing 140 and metadata management. The metadata processing 140 may update metadata associated with the IaaS resources, and may update the request status and resource status in the resource database shards 150 to reflect the resource state information, to maintain the metadata stored in the resource database shards 150 and/or to permit the request clearing 130 to determine whether to persist subsequent resource requests addressing the same resource to the downstream service 112 (e.g., in a system where only a single request may act on a resource at a time, such that the request clearing will not persist a resource request until there are no other pending requests acting on the resource).

While in operation, the resource management system 120 may serve requests on resource metadata (e.g., reads or writes) stored in the resource database shards 150. The requests on the resource database shards 150 may be served on an ongoing basis while the example system 100 is operating. In some embodiments, the example system 100 may increase the storage capacity of the resource management system 120 adding resource database shards 150 in such a way that request service by the example system 100 may not be significantly impacted. For example, as described in more detail in reference to FIGS. 3-5, resharding in accordance with adding physical database shards may include implementing live migration techniques that permit ongoing request serving on the resource database shards 150.

Managing the resource metadata may include approaches for mapping tenancy or compartment level information to physical database locations corresponding to the resources. For example, rather than requests on specified resource metadata, the example system 100 may permit requests to be served by tenancy identifier, compartment identifier, or resource identifier. In some embodiments, compartments of a tenancy are represented by a tree that is rooted by the tenancy identifier. As such, the tenancy may serve as a root compartment, and usage quota metadata may be aggregated at the tenancy level. In this way, the example system 100 may implement mappings to relate system resources to resource metadata stored in physical storage. To that end, the example system 100 may implement resharding operations that include remapping tenancy identifier, compartment identifier, and/or resource identifiers to physical database shards.

Figure 2:
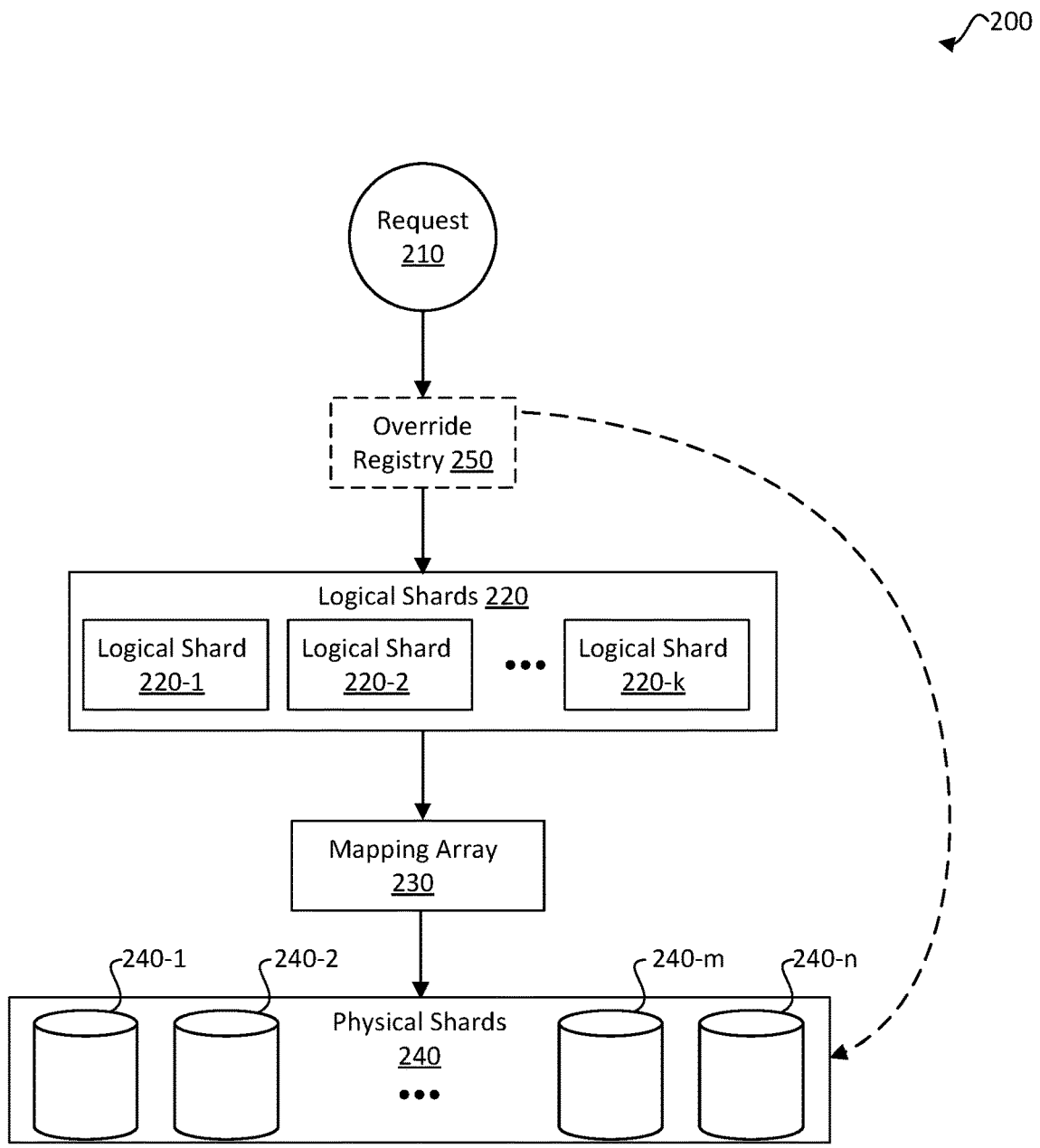
FIG. 2 illustrates an example technique for serving a request on resource metadata, in accordance with one or more embodiments.

FIG. 2 illustrates an example technique 200 for serving a request on resource metadata, in accordance with one or more embodiments. During operation of the resource metadata management system, requests may be received for read/write access to resource metadata stored in resource database shards (e.g., resource database shards 150 of FIG. 1). As part of managing the operation of a cross-service metadata database, the example technique 200 may include various approaches to distribution and mapping of compartments to physical shards, for example, when the number of compartments exceeds the number of physical shards.

In some embodiments, a request 210 may be received for access to resource metadata. The request 210 may be or include a request for read/write access to the resource metadata. In some cases, the request 210 may specify resource metadata specifically, but the request 210 may also specify resource metadata by providing a resource identifier, a tenancy identifier or a compartment identifier. For example, the request 210 may be a read request for resource metadata associated with a specific IaaS resource, accessed by providing a database management system (e.g., resource management system 120 of FIG. 1) with an identifier of the resource (e.g., a resource ID). In this way, the example technique 200 may include approaches for mapping the identifier included in the request 210 to a physical location of the referenced resource metadata. The mapping may be facilitated by defining a number of logical shards 220. Each logical shard 220-1-220-$n$ may be identified with a single system resource, such as may be the subject of the request 210. In turn, the logical shards 220 may be mapped, via a mapping array 230, to the physical shards 240.

In an illustrative example, a database system may include one thousand logical shards 220 mapped to ten physical shards 240. In this example, the mapping array 230 may distribute the logical shards 220 between the physical shards 240. The mapping array 230 may define a uniform distribution of logical shards 220 across the physical shards 240, such that one hundred logical shards 220 are mapped to each of the ten physical shards 240. Alternatively, the mapping array 230 may implement load-balancing techniques by distributing logical shards 220 according to a relative volume of requests addressed at the resource metadata. As such, the request 210 may be directed to a logical shard 220-2, which may in turn be mapped to a physical shard 240-1. In some embodiments, so-called "noisy tenancies" that receive an outsized number of requests relative to other tenancies may be included in an override registry 250. The override registry 250 may identify the location in the physical shards 240 of the resource(s) identified in the request 210, omitting reference to a physical shard.

Through implementing the logical shards 220 and the mapping array 230, the physical shards 240 may be managed independently of the number of resources and tenancies that are served. For example, the location of metadata in the physical shards 240 and the number of physical shards 240 may change without affecting the logical shards 220 by compensating through the mapping array 230. As described in more detail in reference to FIG. 3, increasing the number of physical shards 240, for example, in response to a request to reshard the database, may include remapping the mapping array 230 and migrating data among the physical shards 240.

Figure 3:
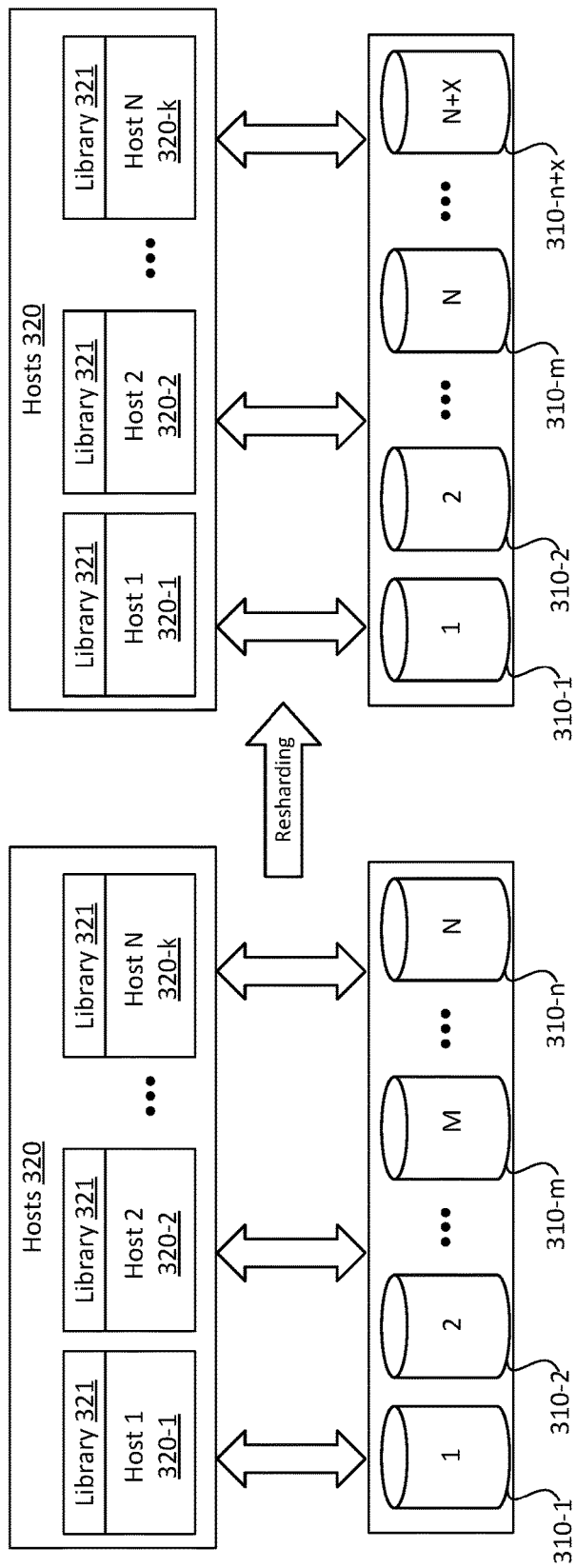
FIG. 3 illustrates an example technique for resharding a resource metadata database, in accordance with one or more embodiments.

FIG. 3 illustrates an example technique 300 for resharding a resource metadata database, in accordance with one or more embodiments. A database system may be described by a total storage capacity, made up by a number ("N") of physical shards each contributing a portion of the total. To increase the total capacity, additional shards ("X") may be added to the database. The process of adding shards, migrating data from existing shards, and remapping the shards so that the data may be served in response to receiving requests, is referred to as resharding.

In some embodiments, N physical shards 310 are accessed by a number ("k") of hosts 320, configured to serve requests on the data stored in the physical shards 310. The hosts 320 may access a library 321 to identify the proper physical shard 310 on which to serve requests for a given tenancy, compartment, or resource. For example, a host 320 may receive a request to read metadata describing a resource status. The host 320 may access the library 321 to identify the physical shard 310 where the data may be found.

In anticipation of the physical shards 310 reaching capacity, additional physical shards 310 may be brought online and integrated into the database system. For example, if the volume of resource metadata increases (e.g., corresponding to the number of compartments) in such a way that the total volume of data is projected to exceed the total capacity of the physical shards 310, additional shards may be added and the library 321 may be revised. In some embodiments, only active hosts may be affected by resharding. For example, a database system may include hosts that are inactive or idle. In such cases, resharding may affect active hosts or may also affect inactive hosts.

During resharding, the data stored in the physical shards 310 may be migrated and remapped from the configuration in which they are stored to a new configuration incorporating the additional shards. As part of resharding, a subset of the data stored in the physical shards 310 may be migrated to the new shards. The migration may be implemented in a way that distributes data across the physical shards 310, rather than simply opening the additional shards to write requests. For example, in reference to the logical shards described above (e.g., logical shards 220 of FIG. 2), in a system with one thousand logical shards and ten physical shards 310, each physical shard may be mapped with one hundred logical shards. Adding two additional physical shards, therefore, may be accompanied by redistributing the logical shards across the physical shards. In the example described, this could, for example, include identifying data associated with thirteen logical shards from the logical shards mapped to each of the physical shards 310, and migrating the data to either of the newly added physical shards. In this way, each of the physical shards 310, after resharding, may store data mapped to eighty-three logical shards, rather than one hundred logical shards. As such, the redistribution may affect a minimal number of logical-shards. As opposed to other approaches that may redistribute all resource metadata, the implementation of the logical shards may reduce the volume of data that is migrated.

Advantageously, resharding may be implemented in such a way that it minimally impacts the serving of requests on the physical shards. For example, while the process of identifying the data to migrate, redefining the mapping of logical to physical shards, and migrating the data, techniques for maintaining service on the data may be implemented. In this way, resharding may avoid downtime of the database and may have a limited impact on the overall latency of the system. Such an approach may include multiple phases of resharding, wherein operations include addressing requests to the existing configuration of the database while migration is underway, cleaning the physical shards 310 of redundant data, and maintaining consistency of the system and data at the compartment level.

Figure 4:
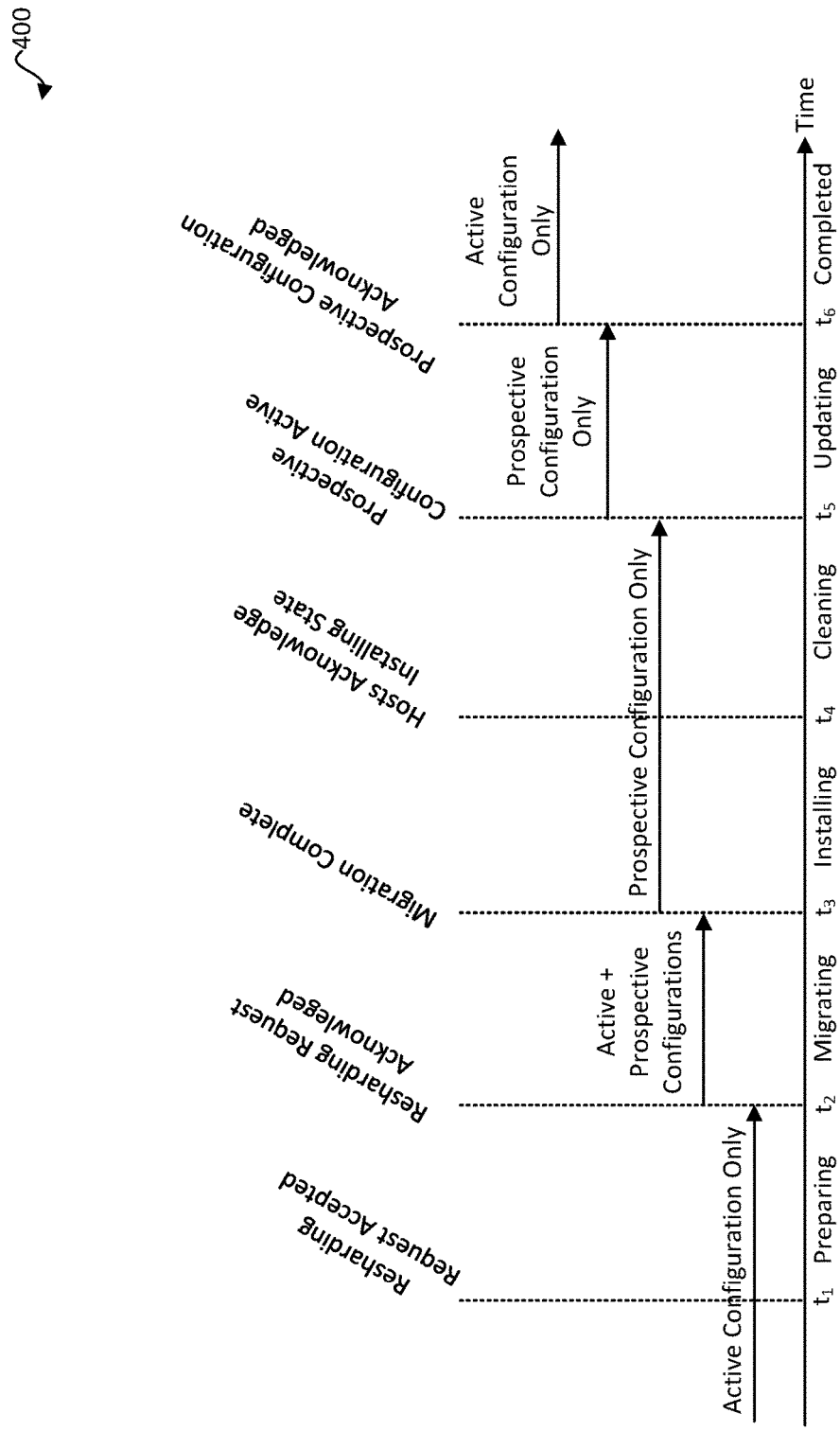
FIG. 4 illustrates an example technique for serving requests on resource metadata while resharding a resource metadata database, in accordance with one or more embodiments.

FIG. 4 illustrates an example technique 400 for serving requests on resource metadata while resharding a resource metadata database, in accordance with one or more embodiments. Advantageously, resharding may be implemented such that a consistent state is maintained. Consistency, in this context, may refer to one consistent state of the database system being observable to concurrent requestors as part of serving requests on the database. In this way, two requests made on the same data will receive the same physical location for the data while resharding is underway. Similarly, compartment-level aggregation may be consistent at least while resharding is underway. In some embodiments, resource metadata may be aggregated on a compartment level, for example, as an approach to tracking resource usage for the purposes of maintaining a usage quota. In this context, consistency of compartment-level aggregation may refer to all aggregation data being maintained in reference to the existing configuration for the subset of data that is being migrated, while resharding is underway. Finally, resharding may also be implemented such that requests continue to be served on the data in the physical shards while migration is underway. As described in more detail, below, while migration operations are proceeding, data that are excluded from the subset identified for migration may be accessed differently from, those data included in the subset, for example, by implementing a temporary access lock on individual data on a resource-level. Together, the example technique 400 represents a significant technological improvement, at least because it provides for live-scaling of databases with migration of data and remapping in such a way that permits ongoing service of access requests to data, with state consistency, aggregation data consistency, negligible or no down-time of access, and insignificant increase in system latency during migration.

In some embodiments, resharding may include multiple constituent stages, where each stage may include a terminal condition, so that hosts (e.g., hosts 320 of FIG. 3) reach a given state before a subsequent stage commences. In some cases, this progression may be facilitated by distributed transactions and resource-based locking mechanisms. As illustrated in FIG. 4, a database system may implement the example technique 400 in six phases. While FIG. 4 illustrates six phases, additional and/or alternative phases may be included or some phases may be excluded. In the example technique 400, the database system (e.g., example system 100 of FIG. 1) may receive a resharding request. This request may be generated by an associated system, a user of the database system, or other entity, to notify the database system that physical storage capacity of the physical database shards (e.g., physical shards 240 of FIG. 2) has increased, for example, when new shards have been added. Accepting the request, for example, by an acknowledgment to the sender of the resharding request, may be a threshold event to initiate a preparing stage. In terms of a logical time ("t"), the initiation of the preparing stage may be attributed logical time $t_1$. During the preparing stage, a resharding request may be accepted and reflected in a configuration database. The configuration database may describe a system or sub-system that implements the resharding (e.g., a sub-system of resource management system 120 of FIG. 2 or metadata processing 140 of FIG. 1). Additionally, tasks related to the migration of the data may be created in the configuration database.

During the preparing stage, requests served on the data stored in the physical shards may continue using the active database configuration. In this context, the active database configuration refers to the mapping of compartment and/or resource identifiers to physical shards for the initial number of physical shards, as described in more detail in reference to FIG. 2. For example, in the example of increasing the number of shards form an initial ten shards to twelve shards, the active configuration refers to the mapping of data based on the database including ten shards. By contrast, a prospective configuration describes the state of the database following resharding, using twelve physical shards. In the previous example, where a subset of the data in each shard is to be migrated to one of the two newly-added physical shards, the prospective configuration reflects the new physical locations of the data, accessed using a new mapping of resource and/or configuration identifiers to twelve physical shards. In this way, the preparing stage may include determining the subset of data to be migrated and generating the prospective configuration and new mapping.

A transition between the preparing and the migrating phases may be initiated at $t_2$ by hosts (e.g., hosts 320 of FIG. 3) of the database system acknowledging the resharding request. The migrating phase may include processing data migration tasks. Data migration may describe operations to transfer data included in the subset of data to-be-moved to locations in the newly-added physical shards, as specified by the prospective configuration. For example, a logical shard (e.g., logical shard 220 of FIG. 2) and associated data may be migrated to a new physical shard (e.g., according to the prospective configuration). In some cases, data associated with a compartment that is mapped to the logical shard may be copied to the new physical shard when processing the task that remaps the logical shard to the new physical shard. In this way, the migrating phase of resharding may include multiple operations, including, but not limited to, copying data from one physical shard to another physical shard and remapping compartments and/or resources to logical shards and/or physical shards.

In some embodiments, compartment-level consistency may implicate migration of data between physical shards included in the active configuration. For example, when compartment-level data migration is atomic (e.g., all data associated with a compartment is transferred, or none is transferred), load-balancing techniques may be applied to balance the volume of data across the physical shards. In this way, migration may avoid overloading newly-added shards.

As described above, the migrating phase may include implementing aspects of live-migration, whereby requests may be served on resource metadata while migration is underway. For example, an entry included in the subset to be moved may be locked while being copied to the new physical location. Locking in this context may describe a temporary delay in serving requests on the particular entry while executing the copy. In this way, a change may be implemented in the way that requests are served on data after migration, thereby permitting resharding to provide consistency and live-migration. For example, a request for reading an entry included in the subset to-be-moved may be served by getting the location of the entry according to the active configuration before it is moved. In contrast, once an entry is moved, the system may return its location according to the prospective configuration. While migrating, however, requests made on a particular entry may be delayed as part of locking the resource-level data.

Implicated in the process of serving requests on data included in the subset of to-be-moved data, the configuration used for to-be-moved data may remain the active configuration during the migrating phase, until the data is moved. Once moved however, the prospective configuration may be used to serve requests. Conditions for terminating the migration stage may include completion of copying operations on the subset of data and receipt of acknowledgment from all hosts that the migration phase has been initiated. In this way, the example technique 400 provides for migration to be complete before initiating an installing phase, at $t_3$, which may prevent inconsistent service on requests for data. In some embodiments, the installing phase may describe a period of resharding where requests are served according to the prospective configuration, after migration operations are complete, but before the system has received acknowledgement from the hosts involved in resharding. Installing may also include modifying the states of data that has been moved during the migrating phase to reflect that the data is no longer eligible to be moved. For example, resource metadata stored in the physical shards may include a state parameter, such as "CanMove" that may be set to "False" in the installing phase.

As illustrated in FIG. 4, the example technique 400 may include a cleaning phase, at $t_4$, where redundant data stored in the physical shards according to the active configuration may be removed from the previous physical locations. Removal, in this context, may describe storage operations for re-designating the storage capacity as empty. As with the installing phase, during the cleaning phase requests on data may be served according to the prospective configuration. In some cases, the cleaning phase may be terminated when hosts acknowledge that the prospective configuration has been adopted for serving requests on the data stored in the physical shard.

When cleaning operations are completed, and where resources are mapped to data in the physical shards according to the prospective configuration, the cleaning phase may be terminated. Following cleaning, a completing phase may include an updating phase, at $t_5$, where the prospective configuration is redesignated as the active configuration. Once the hosts have acknowledged the new active configuration, the example technique 400 may be completed, at $t_6$. Once completed, the system may be able to accept another resharding request at a later time, for example, when physical shards are added or removed from the database.

Figure 5:
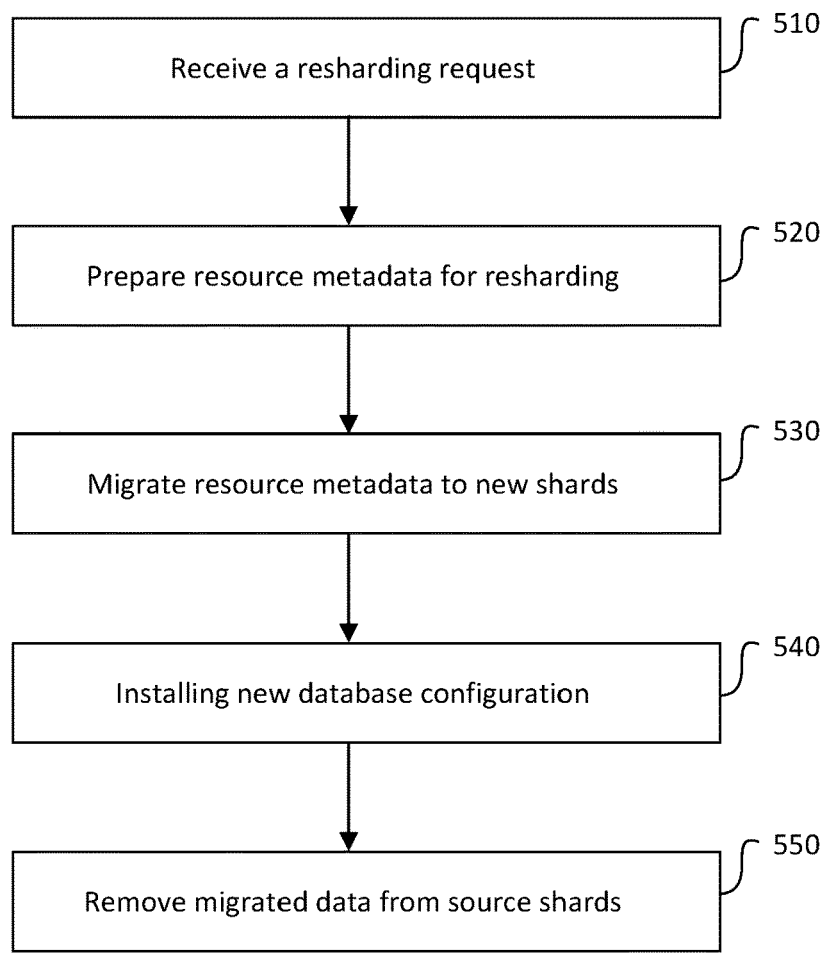
FIG. 5 illustrates an example flow for resharding a resource metadata database, in accordance with one or more embodiments.

FIG. 5 illustrates an example flow 500 for resharding a resource metadata database, in accordance with one or more embodiments. The operations of the flow can be implemented as hardware circuitry and/or stored as computer-readable instructions on a non-transitory computer-readable medium of a computer system, such as the resource management system 120 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 500 includes an operation 510, where the computer system receives a resharding request. A resharding request may be generated as part of modifying the number of shards associated with a database (e.g., resource database shards 150 of FIG. 1). For example, a resharding request may correspond to adding new shards to the database. As described in reference to FIG. 2, a number of physical shards (e.g., physical shards 240 of FIG. 2) may store data for a number of resources and/or compartments. For example, the data may include resource usage metadata that may reflect the status and assignment of resources (e.g., compute resources) to compartments identified with a user of an IaaS system. The computer system may form a part of a resource metadata management system (e.g., resource management system 120 of FIG. 1), and may communicate with associated database systems that serve requests on data stored in the physical shards (e.g., hosts 320 of FIG. 3). Receiving the resharding request may include initiating a resharding process, as described in more detail in reference to FIGS. 3-4.

In an example, the flow 500 includes an operation 520, where the computer system prepares resource metadata for resharding. Preparation may include executing, by the computer system, various tasks associated with migrating a subset of data among the physical shards. For example, when new shards are added, a subset of the data in the shards may be identified for migration to the newly-added shards. In general, preparing resource metadata for resharding may describe operations by which the computer system generates a prospective configuration of the database and a new mapping of compartments and/or resources to the physical locations storing relevant metadata. In some embodiments, preparing may also include notifying hosts that the resharding request has been received and is being implemented, and may also include receiving acknowledgment of the resharding request from the hosts, such that the computer system may commence migration of data included in the subset once the acknowledgment from the hosts has been received. As described in reference to FIGS. 2-3, the prospective configuration may include redistribution of logical shards among physical shards. For example, the logical shards, attributed to compartments in a distributed computing system, may be distributed evenly across the physical shards. In some cases, the activity of a compartment, which may be reflected in the frequency of requests made on metadata stored in the physical shards, may justify a direct identification of the compartment with a physical shard, rather than through a logical shard. For example, a "noisy tenancy" that makes a relatively high volume of requests, may be individually assigned to a specific physical shard to potentially limit its impact on latency with respect to requests made by other compartments. Similarly, activity may serve as a criterion for redistributing logical shards in the prospective configuration. For example, rather than simply redistributing arithmetically, the average request volume may be balanced across physical shards by selecting which logical shards are to-be-migrated (e.g., included in the subset of data that will be migrated to the newly-added physical shards). As described in reference to FIG. 4, the computer system may wait to complete the operation 520 until an acknowledgement of the resharding request has been received from the hosts (or active hosts).

In an example, the flow 500 includes an operation 530, where the computer system migrates the resource metadata to new shards. Migrating data may include copying data stored according to the active configuration and moving the data to the newly-added physical shards according to the prospective configuration. Several types of data may be identified during the migrating phase, including, but not limited to, "to-be-moved", "moved," "not subject to move." The first and second types describe data that have been included in the subset for migration, while the third describes data excluded from the subset of data that is migrated during the migration phase.

During resource metadata migration, the computer system may continue to serve requests on data stored in the physical shards in several ways. For example, "to-be-moved" data and "not subject to move" data may be served based on the active configuration, while "moved" data may be served according to the prospective configuration. In this way, even though "moved" data may remain in the physical shards according to the active configuration as well, the computer system may provide consistency with respect to requests by using the prospective configuration to serve requests on "moved" data. As such, requests to update "moved" data that reference the active configuration may be rejected by the computer system, as an approach to maintaining consistency. In some cases, requests to create new entries (e.g., write requests for newly-created resources) may be served on the active configuration while migration is underway. The migration stage may terminate when the hosts acknowledge the migrating phase and the computer system completes the move tasks (e.g., "to-be-moved" data becomes "moved" data).

In an example, the Flow 500 includes an operation 540, where the computer system installs the prospective configuration. Installing, in this context, may refer to the computer system using the prospective configuration to serve all requests made on data stored in the physical shards. For example, both "not subject to move" and "moved" data may be served using the prospective configuration and corresponding mapping of logical shards to physical shards (e.g., "to-be-moved" may no longer be an applicable category following migration). In this way, requests to read and write to data in the physical shards may reference the prospective configuration and the corresponding mapping of compartments and/or resources to physical shards (e.g., using the mapping array 230 of FIG. 2). The computer system may update the state of data stored according to the prospective configuration to reflect that the migration has been completed, for example, by setting a "can move" state parameter of the data to "false." The installing operations, which may precede cleaning and completion, may terminate when hosts (or active hosts) acknowledge an installing status, which indicates that migration is complete and that the active configuration is no longer being used to serve requests by the hosts.

In an example, the flow 500 includes an operation 550, where the computer system removes migrated data from source shards. As part of maintaining consistency and to reduce redundant data in the physical shards, data remaining in the physical shards that was moved during migration may be removed (e.g., deleted) from the physical shards. During operation 540, the computer system may delete redundant entries corresponding to the subset of data that was migrated from the physical shards, and may remove the mapping and configuration previously designated the active configuration. In this way, the prospective configuration may become the new active configuration, and the computer system may mark the resharding request as complete.

Live migration during resharding may provide a significant technical improvement for the operation of a database system that incorporates a number of shards (e.g., partitions). By implementing the techniques of resharding, including serving requests while migrating data between active and prospective configurations, consistency on a resource and a compartment level may be maintained. In this way, resource management operations, facilitated by cross-service metadata tracking, may continue uninterrupted, and with limited change in latency. Reducing downtime, in particular, may provide significant improvements to IaaS system performance as a whole, where the database undergoing resharding serves a gate-keeping function. For example, a resource metadata management system that validates resource requests against usage quotas may delay overall system operations were it to experience downtime during resharding. As such, live migration permits the issue of downtime to be resolved without impacting the function of the resource metadata management system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
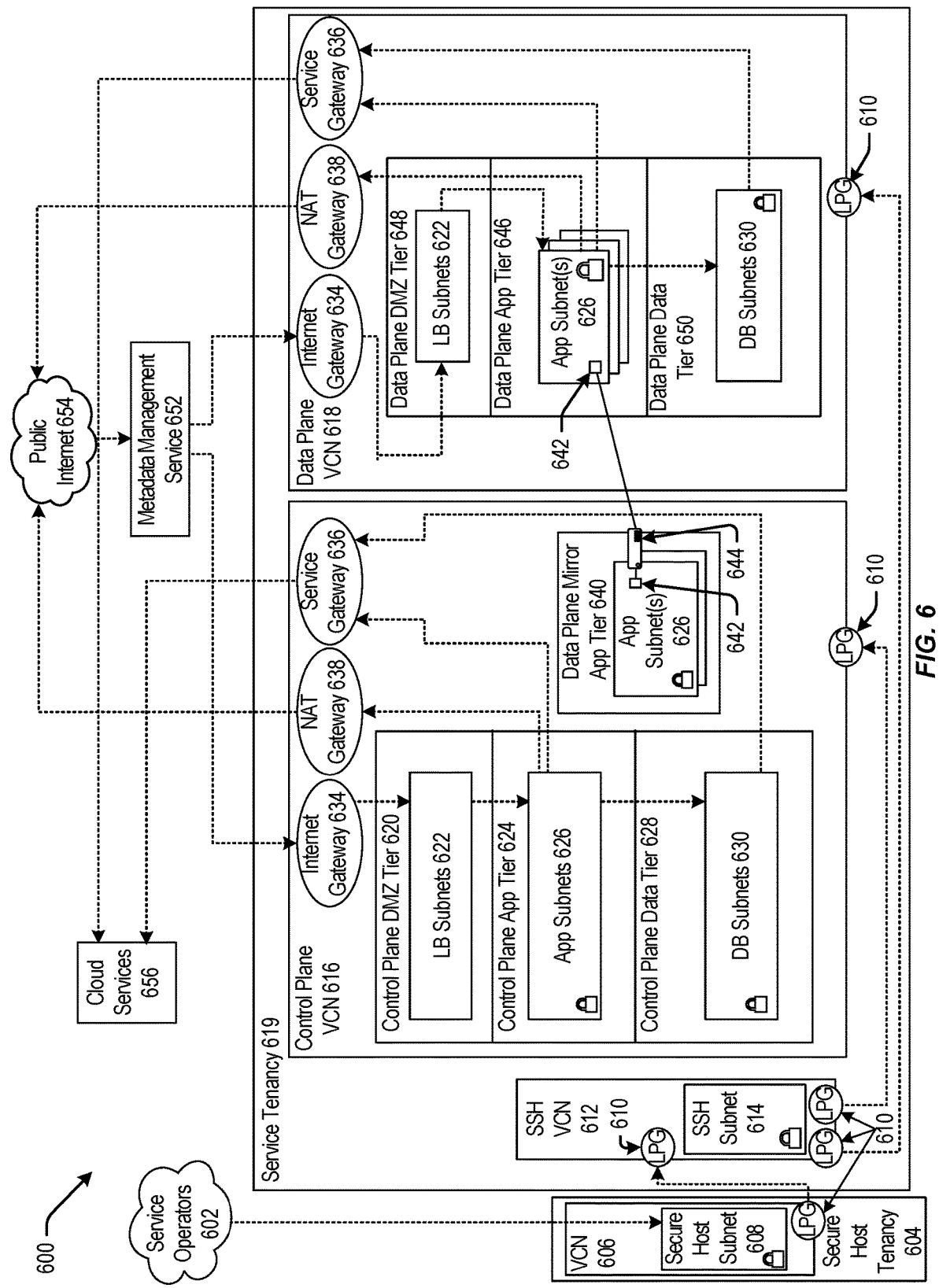
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 6, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
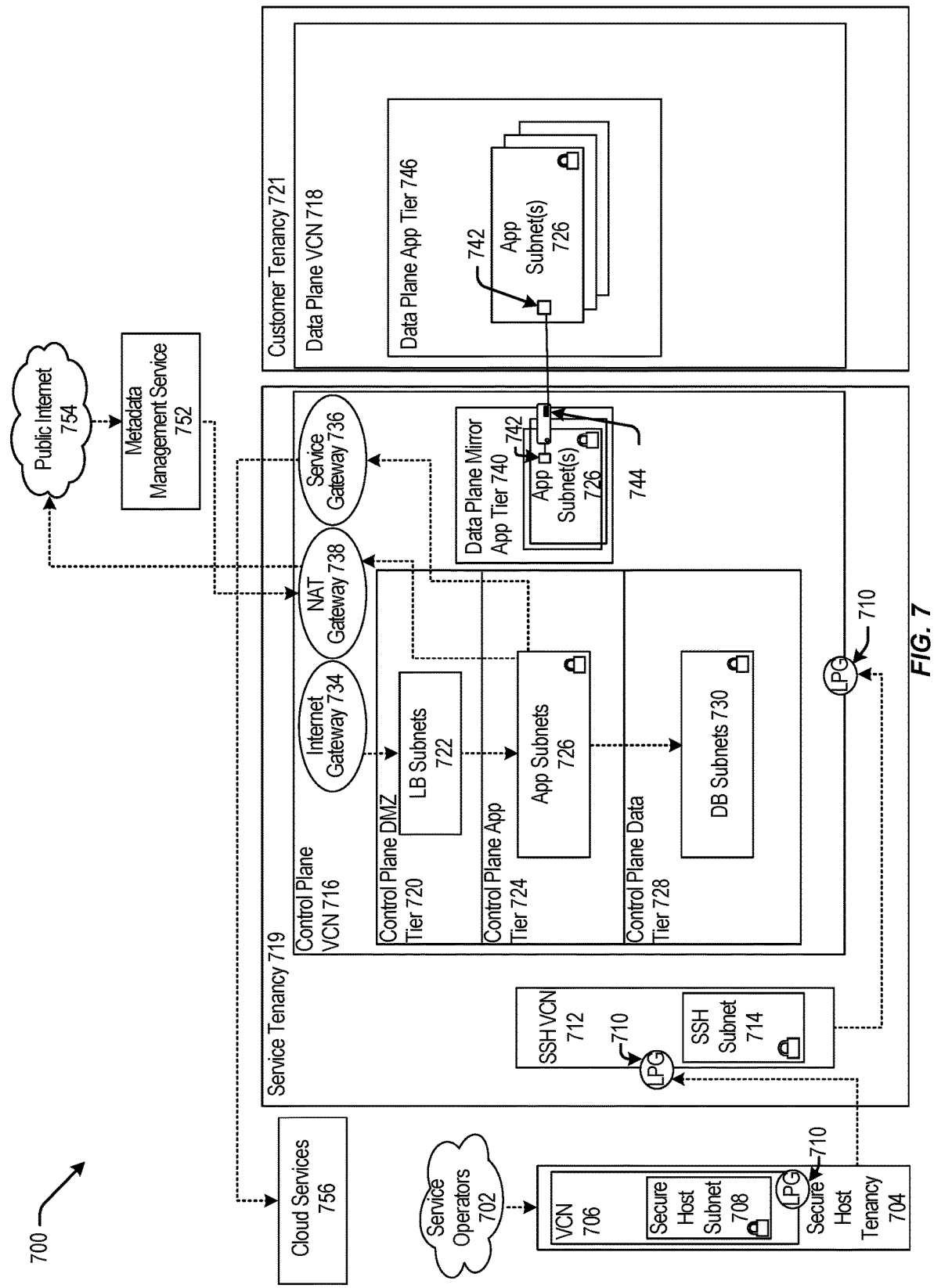
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
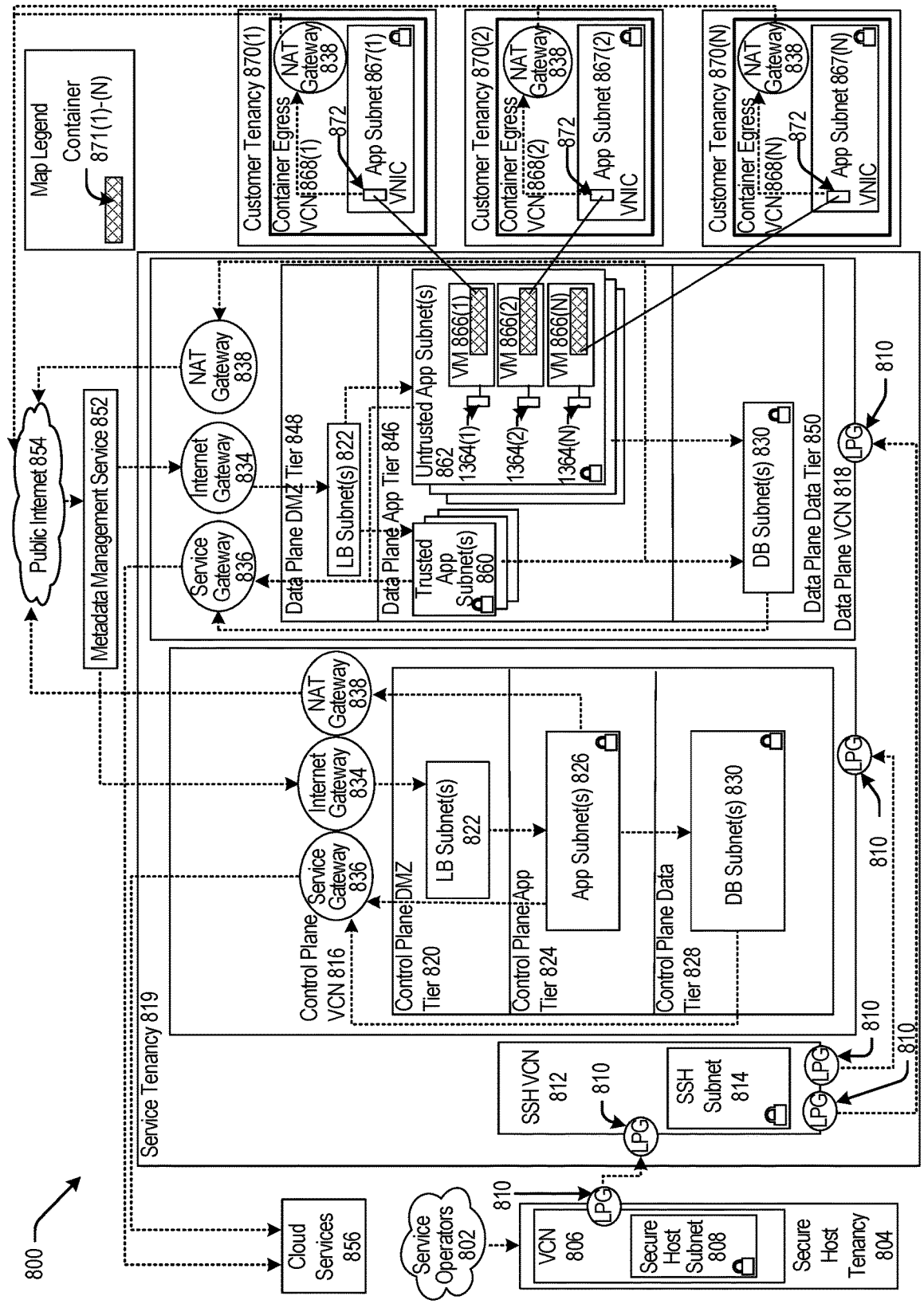
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
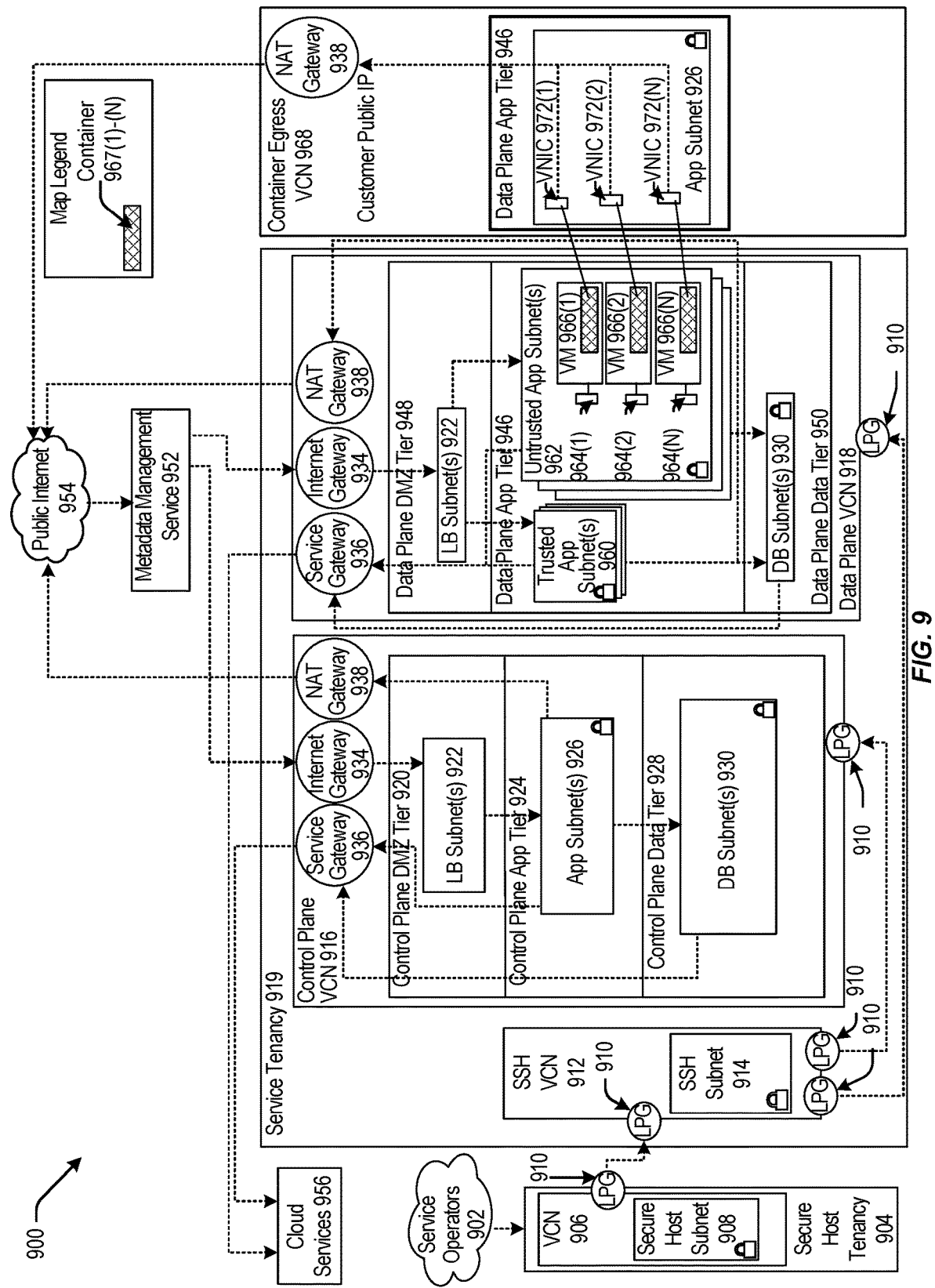
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
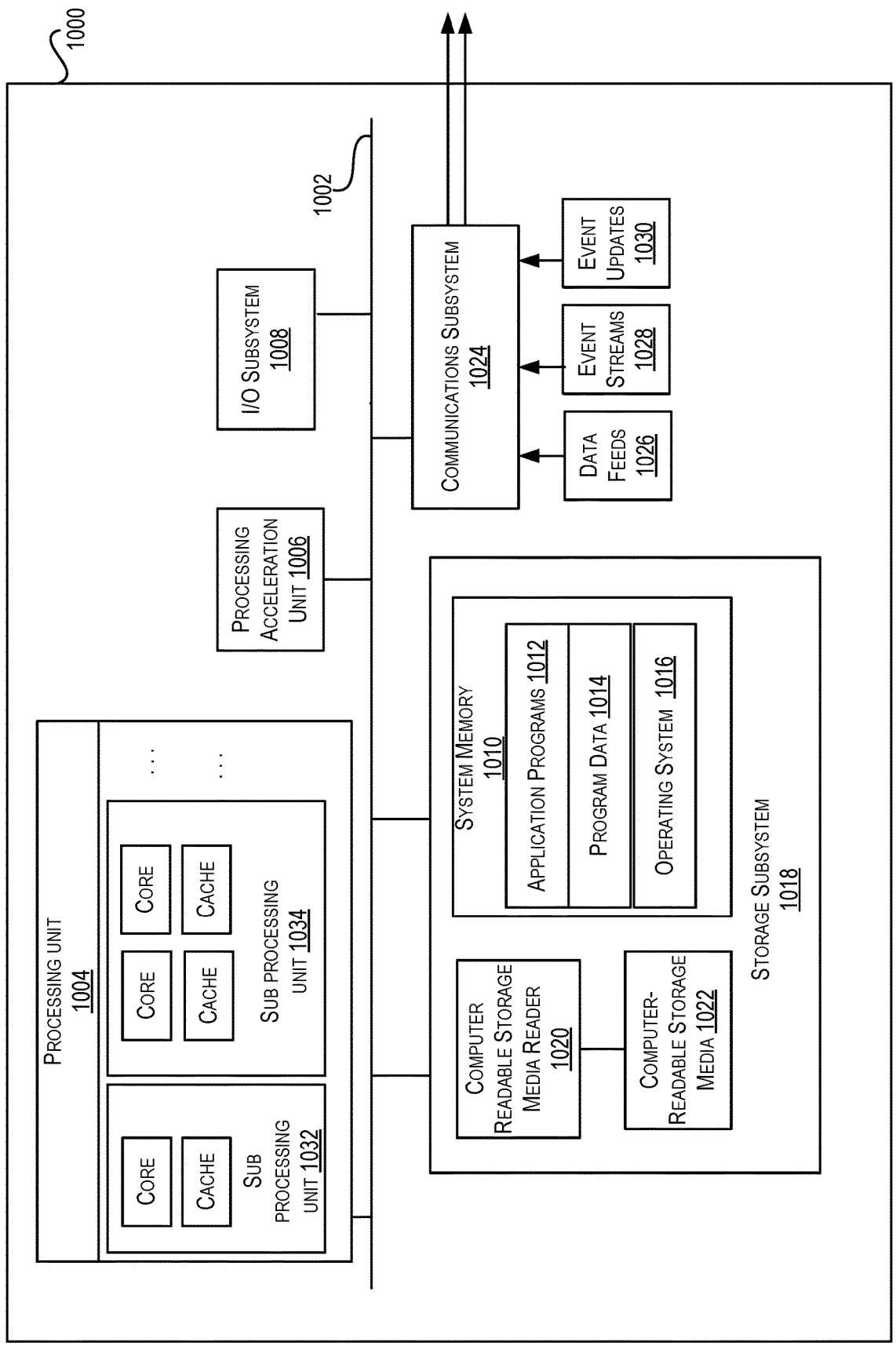
FIG. 10 is a block diagram illustrating an example computer system, according to at least one embodiment.

FIG. 10 illustrates an example computer system 1200, in which various embodiments may be implemented. The system 1200 may be used to implement any of the computer systems described above. As shown in the figure, computer system 1200 includes a processing unit 1004 that communicates with a number of peripheral subsystems via a bus subsystem 1202. These peripheral subsystems may include a processing acceleration unit 1006, an I/O subsystem 1208, a storage subsystem 1218 and a communications subsystem 1224. Storage subsystem 1218 includes tangible computer-readable storage media 1022 and a system memory 1010.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1200. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1218. Through suitable programming, processor(s) 1004 can provide various functionalities described above. Computer system 1200 may additionally include a processing acceleration unit 1006, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1010. System memory 1010 may store program instructions that are loadable and executable on processing unit 1004, as well as data generated during the execution of these programs.

Depending on the configuration and type of computer system 1200, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1004. Storage subsystem 1218 may also provide a repository for storing data used in accordance with the present disclosure.

Storage subsystem 1200 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1026, event streams 1028, event updates 1030, and the like on behalf of one or more users who may use computer system 1200.

By way of example, communications subsystem 1224 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1026, event streams 1028, event updates 1030, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    receiving, by a computer system, a resharding request associated with a database, the database configured to store resource metadata according to a first database configuration, the resource metadata identified by a first mapping;
    preparing, by the computer system, the resource metadata for migration to a second database configuration corresponding with a second mapping;
    migrating, by the computer system, a subset of the resource metadata within the database in accordance with the second mapping;
    while migrating the subset of the resource metadata, serving, by the computer system, requests on the resource metadata according to the first database configuration;
    after migrating the subset of the resource metadata, installing, by the computer system, the second database configuration; and
    removing, by the computer system, the subset of the resource metadata remaining in the database according to the first database configuration.

2. The method of claim 1, wherein the resharding request corresponds to an increase in a number of physical partitions of the database.

3. The method of claim 2, wherein the number of physical partitions is a first number of physical partitions, and wherein for an entry of the resource metadata:
    the first mapping describes a first location of the entry in the first number of physical partitions in accordance with the first database configuration; and
    the second mapping describes a second location of the entry in a second number of physical partitions in accordance with the second database configuration.

4. The method of claim 1, wherein preparing the resource metadata for migration comprises:
    generating the second mapping corresponding to the second database configuration;
    determining the subset of the resource metadata;
    notifying a plurality of active hosts of the resharding request and the second mapping; and
    receiving an acknowledgment of the resharding request from the plurality of active hosts.

5. The method of claim 1, wherein migrating the subset of the resource metadata within the database comprises:
    locating an entry of the subset of the resource metadata in the database using the first database configuration;
    locking the entry for requests;
    copying the entry to a new physical partition of the database, according to the second database configuration; and
    flagging the entry to reflect the second mapping.

6. The method of claim 5, wherein serving the requests on the resource metadata according to the first database configuration comprises:
    receiving a read/write request for an entry according to the first mapping;
    in accordance with the entry being excluded from the subset of the resource metadata, executing the read/write request according to the first mapping;
    in accordance with the entry being included in the subset of the resource metadata and being locked, holding the read/write request while the entry is locked; or
    in accordance with the entry being included in the subset of the resource metadata and being stored in the database according to the first database configuration, executing the read/write request according to the first mapping; or
    in accordance with the entry being included in the subset of the resource metadata and being stored in the database according to the second database configuration, executing the read/write request according to the second mapping.

7. The method of claim 1, wherein installing the second database configuration comprises serving requests on the resource metadata according to the second database configuration after the subset of the resource metadata is migrated.

8. A computer system, comprising:
    one or more processors;
    a memory in communication with the one or more processors, the memory configured to store computer-executable instructions, wherein executing the computer-executable instructions causes the one or more processors to perform steps comprising:
        receiving, by a computer system, a resharding request associated with a database, the database configured to store resource metadata according to a first database configuration, the resource metadata identified by a first mapping;
        preparing, by the computer system, the resource metadata for migration to a second database configuration corresponding with a second mapping;
        migrating, by the computer system, a subset of the resource metadata within the database in accordance with the second mapping;
        while migrating the subset of the resource metadata, serving, by the computer system, requests on the resource metadata according to the first database configuration;
        after migrating the subset of the resource metadata, installing, by the computer system, the second database configuration; and
        removing, by the computer system, the subset of the resource metadata remaining in the database according to the first database configuration.

9. The computer system of claim 8, wherein the resharding request corresponds to an increase in a number of physical partitions of the database.

10. The computer system of claim 9, the number of physical partitions is a first number of physical partitions, and wherein for an entry of the resource metadata:

the first mapping describes a first location of the entry in the first number of physical partitions in accordance with the first database configuration; and the second mapping describes a second location of the entry in a second number of physical partitions in accordance with the second database configuration.

11. The computer system of claim 8, wherein preparing the resource metadata for migration comprises:
generating the second mapping corresponding to the second database configuration;
determining the subset of the resource metadata;
notifying a plurality of active hosts of the resharding request and the second mapping; and
receiving an acknowledgment of the resharding request from the plurality of active hosts.

12. The computer system of claim 8, wherein migrating the subset of the resource metadata within the database comprises:
locating an entry of the subset of the resource metadata in the database using the first database configuration;
locking the entry for requests;
copying the entry to a new physical partition of the database, according to the second database configuration; and
flagging the entry to reflect the second mapping.

13. The computer system of claim 8, wherein migrating the subset of the resource metadata within the database further comprises:
receiving new resource metadata; and
storing the new resource metadata according to the first database configuration.

14. The computer system of claim 8, wherein serving the requests on the resource metadata according to the first database configuration comprises:
receiving a read/write request for an entry according to the first mapping;
in accordance with the entry being excluded from the subset of the resource metadata, executing the read/write request according to the first mapping;
in accordance with the entry being included in the subset of the resource metadata and being locked, holding the read/write request while the entry is locked; and
in accordance with the entry being included in the subset of the resource metadata and being stored in the database according to the first database configuration, executing the read/write request according to the first mapping; and
in accordance with the entry being included in the subset of the resource metadata and being stored in the database according to the second database configuration, executing the read/write request according to the second mapping.

15. A non-transitory computer-readable storage medium, storing computer-executable instructions that, when executed, cause one or more processors of a computer system to perform steps comprising:
receiving, by a computer system, a resharding request associated with a database, the database configured to store resource metadata according to a first database configuration, the resource metadata identified by a first mapping;
preparing, by the computer system, the resource metadata for migration to a second database configuration corresponding with a second mapping;
migrating, by the computer system, a subset of the resource metadata within the database in accordance with the second mapping;
while migrating the subset of the resource metadata, serving, by the computer system, requests on the resource metadata according to the first database configuration;
after migrating the subset of the resource metadata, installing, by the computer system, the second database configuration; and
removing, by the computer system, the subset of the resource metadata remaining in the database according to the first database configuration.

16. The non-transitory computer-readable storage medium of claim 15, wherein the resharding request corresponds to an increase in a number of physical partitions of the database.

17. The non-transitory computer-readable storage medium of claim 16, wherein the number of physical partitions is a first number of physical partitions, and wherein for an entry of the resource metadata:
the first mapping describes a first location of the entry in the first number of physical partitions in accordance with the first database configuration; and
the second mapping describes a second location of the entry in a second number of physical partitions in accordance with the second database configuration.

18. The non-transitory computer-readable storage medium of claim 15, wherein preparing the resource metadata for migration comprises:
generating the second mapping corresponding to the second database configuration;
determining the subset of the resource metadata;
notifying a plurality of active hosts of the resharding request and the second mapping; and
receiving an acknowledgment of the resharding request from the plurality of active hosts.

19. The non-transitory computer-readable storage medium of claim 15, wherein migrating the subset of the resource metadata within the database comprises:
locating an entry of the subset of the resource metadata in the database using the first database configuration;
locking the entry for requests;
copying the entry to a new physical partition of the database, according to the second database configuration; and
flagging the entry to reflect the second mapping.

20. The non-transitory computer-readable storage medium of claim 15, wherein serving the requests on the resource metadata according to the first database configuration comprises:
receiving a read/write request for an entry according to the first mapping;
in accordance with the entry being excluded from the subset of the resource metadata, executing the read/write request according to the first mapping;
in accordance with the entry being included in the subset of the resource metadata and being locked, holding the read/write request while the entry is locked; and
in accordance with the entry being included in the subset of the resource metadata and being stored in the database according to the first database configuration, executing the read/write request according to the first mapping; and
in accordance with the entry being included in the subset of the resource metadata and being stored in the database according to the second database configuration, executing the read/write request according to the second mapping.

* * * * *